(12) United States Patent
Matsumoto et al.

(10) Patent No.: US 8,829,896 B2
(45) Date of Patent: Sep. 9, 2014

(54) STROKE AMOUNT DETECTING DEVICE

(75) Inventors: Koichiro Matsumoto, Kyoto (JP); Akitoshi Mizutani, Okazaki (JP); Kenji Takeda, Okazaki (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 222 days.

(21) Appl. No.: 13/419,731

(22) Filed: Mar. 14, 2012

(65) Prior Publication Data

US 2012/0235673 A1   Sep. 20, 2012

(30) Foreign Application Priority Data

Mar. 16, 2011   (JP) .................................. 2011-57830

(51) Int. Cl.
*G01B 7/14* (2006.01)
*G01D 3/028* (2006.01)
*G01D 5/14* (2006.01)

(52) U.S. Cl.
CPC ............... *G01D 3/028* (2013.01); *G01D 5/145* (2013.01)
USPC ................................ 324/207.21; 324/207.11

(58) Field of Classification Search
CPC ..................................................... G01D 5/145
USPC ....................................... 324/207.11–207.26
See application file for complete search history.

(56) References Cited

U.S. PATENT DOCUMENTS

| 6,211,668 B1 * | 4/2001 | Duesler et al. ............. 324/207.2 |
| 2004/0239313 A1 | 12/2004 | Godkin |
| 2005/0151535 A1 * | 7/2005 | Hagino et al. ............. 324/207.2 |
| 2006/0061353 A1 * | 3/2006 | Etherington et al. ...... 324/207.2 |
| 2008/0106259 A1 * | 5/2008 | Stuve ....................... 324/207.24 |
| 2009/0121708 A1 * | 5/2009 | Lackey ..................... 324/207.2 |

FOREIGN PATENT DOCUMENTS

| JP | 62-229002 | 10/1987 |
| JP | 2008-45919 | 2/2008 |
| JP | 2010-509588 | 3/2010 |

OTHER PUBLICATIONS

Office Action (1 pg.) dated Mar. 19, 2013 issued in corresponding Japanese Application No. 2011-057830 with an at least partial English-language translation thereof (2 pgs.).
Notification of the First Office Action issued for Chinese Patent Application No. 201210069279.X, dated Mar. 5, 2014 (with partial translation).
Office Action (1 page) dated Feb. 13, 2014, issued in corresponding Japanese Application No. 2011-057830 and English translation (2 pages).

* cited by examiner

*Primary Examiner* — Melissa Koval
*Assistant Examiner* — Daniel Miller
(74) *Attorney, Agent, or Firm* — Nixon & Vanderhye P.C.

(57) ABSTRACT

A stroke amount detecting device includes a magnetism detecting unit, a first magnetic field generating unit and a second magnetic field generating unit. A magnetic pole of the first generating unit and a magnetic pole of the second generating unit, which are opposed to each other, have different polarities. A distance between a gap end of the first generating unit and a gap end of the second generating unit, which are located on a farther side of a rectilinear axis, is smaller than a distance between an open end of the first generating unit and an open end of the second generating unit, which are located on a closer side of the rectilinear axis. The magnetism detecting unit detects a stroke amount of an object based on a magnetic flux generated between the open end of the first generating unit and the open end of the second generating unit.

4 Claims, 5 Drawing Sheets

STROKE AMOUNT DETECTING DEVICE

CROSS REFERENCE TO RELATED APPLICATION

This application is based on Japanese Patent Application No. 2011-57830 filed on Mar. 16, 2011, the disclosure of which is incorporated herein by reference.

TECHNICAL FIELD

The present disclosure relates to a stroke amount detecting device that detects a stroke amount of a detection object.

BACKGROUND

Figure 6:
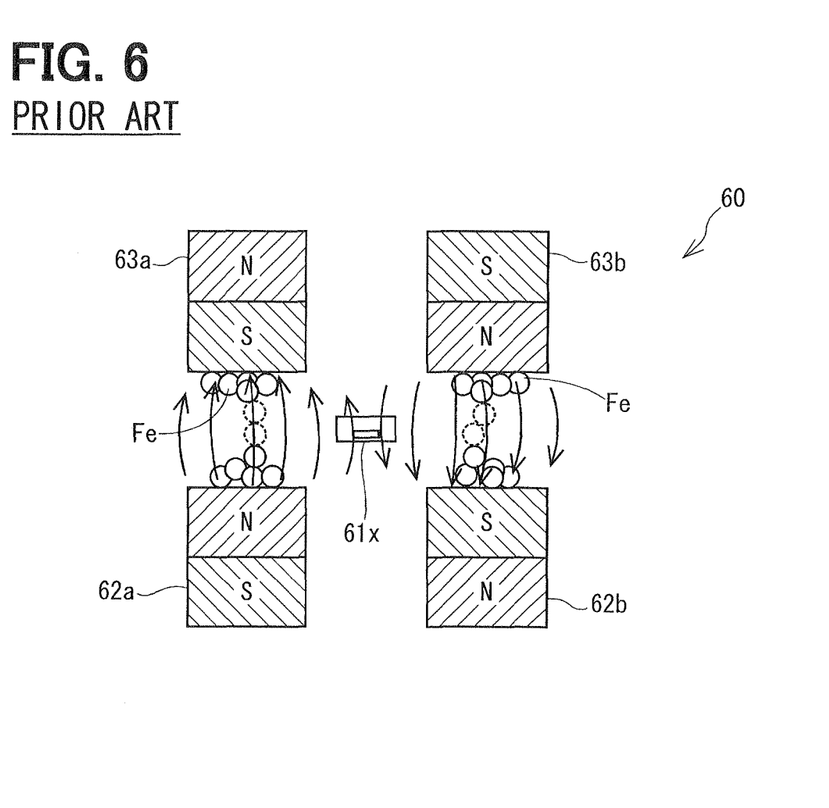
FIG. 6 is a schematic view illustrating a state of attachment of iron powder to a stroke amount detecting device in accordance with a conventional technology.

Conventionally, a stroke amount detecting device, which includes a magnet as a magnetic field generating means and a magnetism detecting element that is displaced relative to the magnet in accordance with a linear movement of a detection object to detect a change of a magnetic field, and which detects a stroke amount of the detection object based on an output signal of the magnetism detecting element, is known. For example, as illustrated in FIG. 6, in a device 60 described in JP-A-2008-45919, four magnets 62a, 62b, 63a, 63b are arranged on one side and the other side within a stroke range to be opposed to each other. Polarities of the opposed magnets are in the same direction, and polarities of adjacent magnets on one side and the other side of the stroke range are in the opposite direction. For this reason, a direction of magnetic flux (arrows in FIG. 6) is reversed on one side and the other side in the stroke range. In addition, a magnetism detecting element 61x is disposed between the opposed magnets.

If a magnetic foreign substance such as iron powder enters into the device in JP-A-2008-45919, it is assumed that the iron powder Fe attaches between the opposed magnets, as illustrated in FIG. 6. In a process of the attachment of the iron powder Fe, first, the iron powder Fe deposits gradually on surfaces of the opposed magnets. At the time of this deposition, a gap between the magnets becomes narrow due to the iron powder Fe, so that the magnetic flux can become strong. The iron powder Fe deposits further, and if the gap between the opposed magnets is bridged as indicated by a broken line in FIG. 6, the magnetic flux disappears. In this manner, due to the attachment of the magnetic foreign substance such as iron powder, characteristics of the device in JP-A-2008-45919 may change, and detection accuracy of the device may be reduced.

SUMMARY

According to the present disclosure, there is provided a stroke amount detecting device for detecting a stroke of a detection object which moves rectilinearly. The device includes a magnetism detecting unit, and a first magnetic field generating unit and a second magnetic field generating unit. The magnetism detecting unit includes a magnetism sensing surface, and is displaced on a rectilinear axis in accordance with the rectilinear movement of the detection object. The first magnetic field generating unit and the second magnetic field generating unit are disposed on one side of the rectilinear axis. The magnetism detecting unit is displaced relative to the first magnetic field generating unit and the second magnetic field generating unit. The first magnetic field generating unit and the second magnetic field generating unit are arranged to be spaced away from each other and opposed to each other in a direction of the stroke. A magnetic pole of the first magnetic field generating unit and a magnetic pole of the second magnetic field generating unit, which are opposed to each other, are magnetized so as to have different polarities. The first magnetic field generating unit and the second magnetic field generating unit are arranged such that a distance between a gap end of the first magnetic field generating unit and a gap end of the second magnetic field generating unit, which are located on a farther side of the rectilinear axis, is smaller than a distance between an open end of the first magnetic field generating unit and an open end of the second magnetic field generating unit, which are located on a closer side of the rectilinear axis. The magnetism detecting unit is configured to detect an amount of the stroke of the detection object based on a magnetic flux generated between the open end of the first magnetic field generating unit and the open end of the second magnetic field generating unit.

According to the present disclosure, there is also provided a stroke amount detecting device for detecting a stroke of a detection object which moves rectilinearly. The device includes a magnetism detecting unit, a first magnetic field generating unit and a second magnetic field generating unit, a first magnetic flux transmitting unit, and a second magnetic flux transmitting unit. The magnetism detecting unit includes a magnetism sensing surface, and is displaced on a rectilinear axis in accordance with the rectilinear movement of the detection object. The first magnetic field generating unit and the second magnetic field generating unit are disposed on one side of the rectilinear axis. The magnetism detecting unit is displaced relative to the first magnetic field generating unit and the second magnetic field generating unit. The first magnetic field generating unit and the second magnetic field generating unit are arranged to be spaced away from each other and opposed to each other in a direction of the stroke. A magnetic pole of the first magnetic field generating unit and a magnetic pole of the second magnetic field generating unit, which are opposed to each other, are magnetized so as to have different polarities. The first magnetic flux transmitting unit is formed from a magnetic material. A connecting end of the first magnetic flux transmitting unit is connected to an end of the first magnetic field generating unit which is located on a farther side of the rectilinear axis. The second magnetic flux transmitting unit is formed from a magnetic material. A connecting end of the second magnetic flux transmitting unit is connected to an end of the second magnetic field generating unit, which is located on the farther side of the rectilinear axis. The first magnetic field generating unit, the second magnetic field generating unit, the first magnetic flux transmitting unit, and the second magnetic flux transmitting unit are arranged such that a distance between a gap end of the first magnetic flux transmitting unit located on its opposite side from the connecting end of the first magnetic flux transmitting unit and a gap end of the second magnetic flux transmitting unit located on its opposite side from the connecting end of the second magnetic flux transmitting unit is smaller than a distance between an open end of the first magnetic field generating unit, which is located on a closer side of the rectilinear axis, and an open end of the second magnetic field generating unit, which is located on the closer side of the rectilinear axis. The magnetism detecting unit is configured to detect an amount of the stroke of the detection object based on a magnetic flux generated between the open end of the first magnetic field generating unit and the open end of the second magnetic field generating unit.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

A stroke amount detecting device according to embodiments will be described below in reference to the accompanying drawings.

First Embodiment

Figure 2:
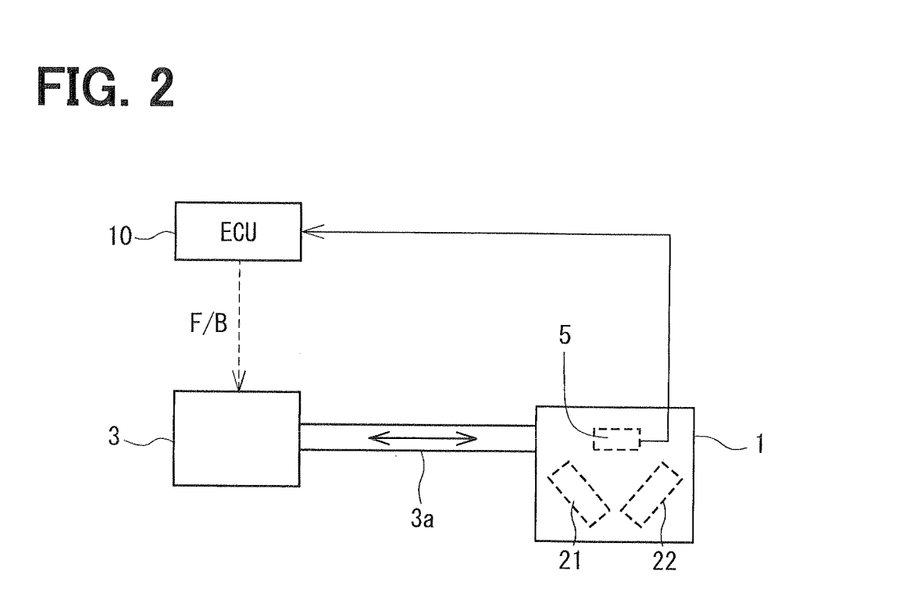
FIG. 2 is a block diagram illustrating an entire configuration of a system to which the stroke amount detecting device of the first embodiment is applied.

The stroke amount detecting device is applied to stroke portions of an automobile, such as a gear transmission, an accelerator, and a brake, to detect a stroke amount which is a detection object. As illustrated in FIG. 2, a stroke amount detecting device 1 includes a first magnet 21 that may serve as a "first magnetic field generating means (unit)", a second magnet 22 that may serve as a "second magnetic field generating means (unit)", and a magnetoresistive element 5 that may serve as a "magnetism detecting means (unit)".

The magnetoresistive element 5 is mounted on a substrate (not shown). This element 5 is displaced relative to the magnets 21, 22 in accordance with a linear movement of a stroke portion 3a of a linear actuator 3 (arrow in right and left directions in FIG. 2) to detect a stroke amount. The detected stroke amount is outputted to an engine control unit (ECU) 10. Based on the stroke amount outputted from the stroke amount detecting device 1, the ECU 10 feedback-controls the linear actuator 3.

The configuration of the stroke amount detecting device 1 will be described with reference to FIG. 1A. A locus along which the magnetoresistive element 5 is displaced relative to magnets 21, 22 is indicated by a "rectilinear axis x". A straight line perpendicular to the rectilinear axis x to define a reference value (zero) of the stroke amount is indicated by a "reference axis y". The stroke amount when the magnetoresistive element 5 is displaced to the right side relative to the reference axis y is indicated by a positive value. The stroke amount when the magnetoresistive element 5 is displaced to the left side relative to the reference axis y is indicated by a negative value. The stroke amount detecting device 1 includes the first magnet 21, the second magnet 22, and the magnetoresistive element 5.

Figure 1A:
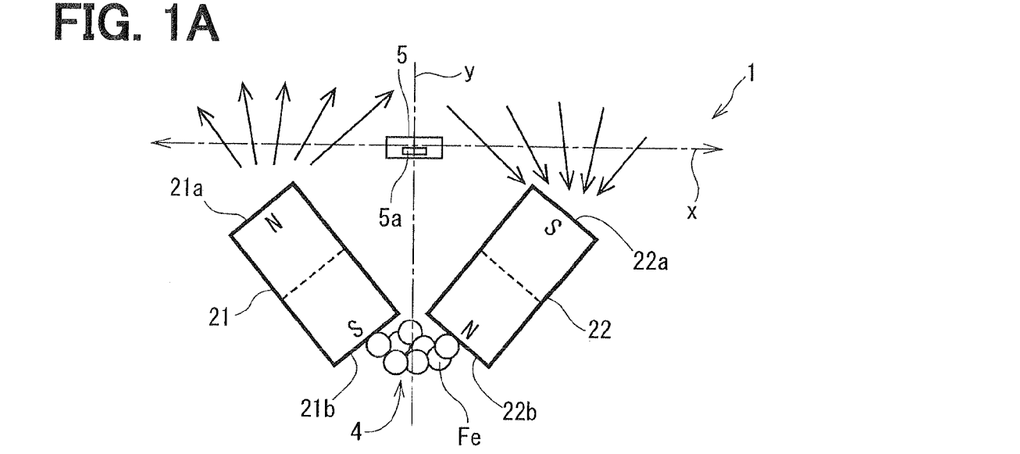
FIG. 1A is a schematic view illustrating a state of attachment of iron powder to a stroke amount detecting device in accordance with a first embodiment.

Sectional shapes of the first magnet 21 and the second magnet 22 in a visual direction of FIG. 1A are rectangular. The first magnet 21 and the second magnet 22 are arranged on one side (lower side in FIG. 1A) relative to the rectilinear axis x symmetrically with respect to the reference axis y as well as at a slant relative to the reference axis y. The first magnet 21 is magnetized to be a north (N) pole on its open end 21a-side, and magnetized to be a south (S) pole on its gap end 21b-side. The second magnet 22 is magnetized to be a south pole on its open end 22a-side, and magnetized to be a north pole on its gap end 22b-side. Accordingly, the first and second magnets 21, 22 are magnetized such that their opposed magnetic poles have different magnetisms from each other.

The open ends 21a, 22a are arranged closer to the rectilinear axis x, and the gap ends 21b, 22b are arranged farther from the rectilinear axis x. A distance between the open end 21a and the open end 22a is relatively long, and a distance between the gap end 21b and the gap end 22b is relatively short. A small air gap 4 is formed between the gap end 21b and the gap ends 22b. At the small air gap 4, the N pole of the magnet 22 and the S pole of the magnet 21 are opposed with a short distance therebetween, so that relatively strong magnetic flux is produced.

Figure 3A:
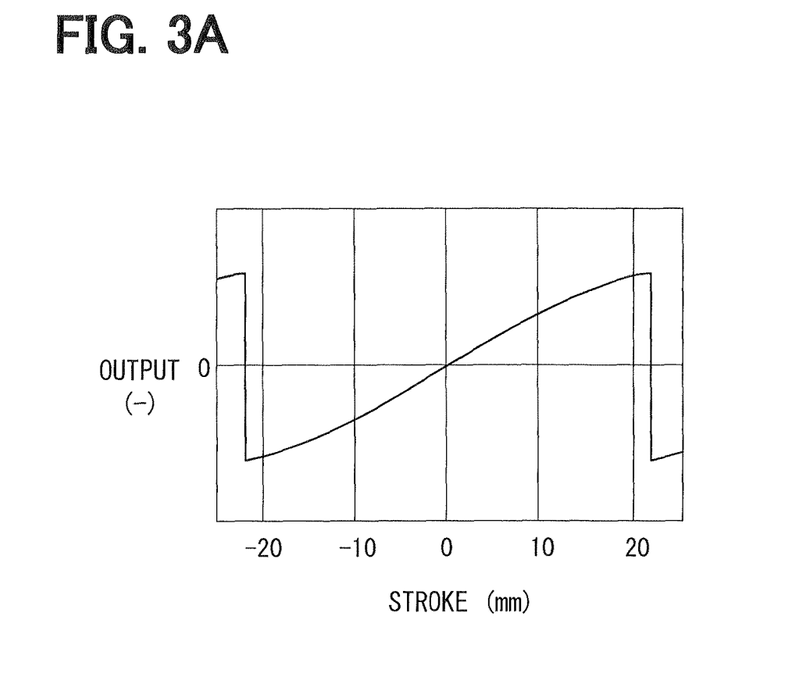
FIG. 3A is a diagram illustrating output characteristics of the stroke amount detecting device of the first embodiment.

As indicated by arrows in FIG. 1A, a magnetic flux vector is produced from the open end 21a of the first magnet 21 toward the open end 22a of the second magnet 22. A direction of this magnetic flux vector changes continuously from one side to the other side of a stroke range. The magnetoresistive element 5 is displaced relatively to the magnets 21, 22 on the rectilinear axis x to detect the direction of the magnetic flux vector by its magnetism sensing surface 5a. Then, the element 5 outputs a signal illustrated in FIG. 3A. The stroke amount detecting device 1 detects the stroke amount of the stroke portion 3a, which is the detection object based on the output signal of the magnetoresistive element 5.

On the assumption that iron powder Fe enters into the stroke amount detecting device 1, the iron powder Fe which has entered in the device 1 is attracted to the strong magnetic flux of the small air gap 4 to be attached preferentially to the gap ends 21b, 22b, and attachment of the iron powder Fe to the open ends 21a, 22a is thereby prevented. The direction of the magnetic flux vector between the open end 21a and the open end 22a does not change because of the attachment of the iron powder Fe to the gap ends 21b, 22b. Therefore, the detection accuracy of the stroke amount detecting device 1 is maintained without exerting influence upon the output of the magnetoresistive element 5.

Figure 3B:
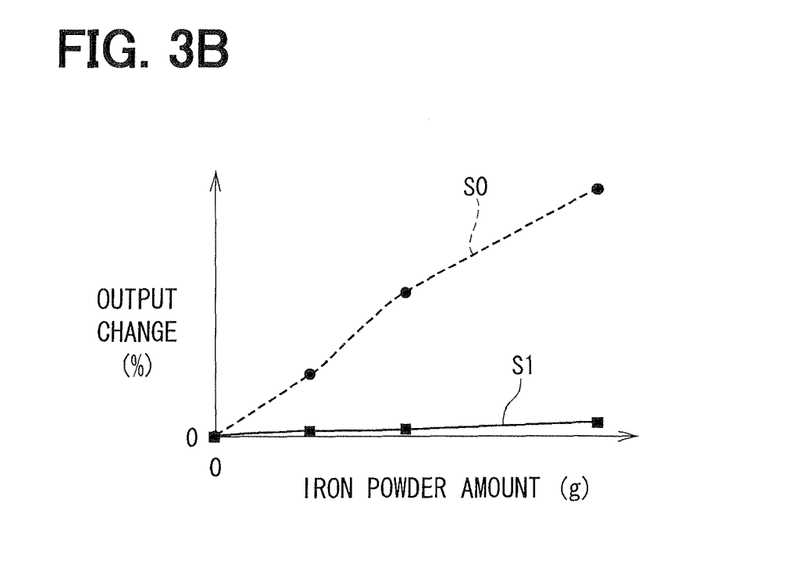
FIG. 3B is a characteristic diagram illustrating output change of the stroke amount detecting device of the first embodiment due to attachment of iron powder.
Figure 5:
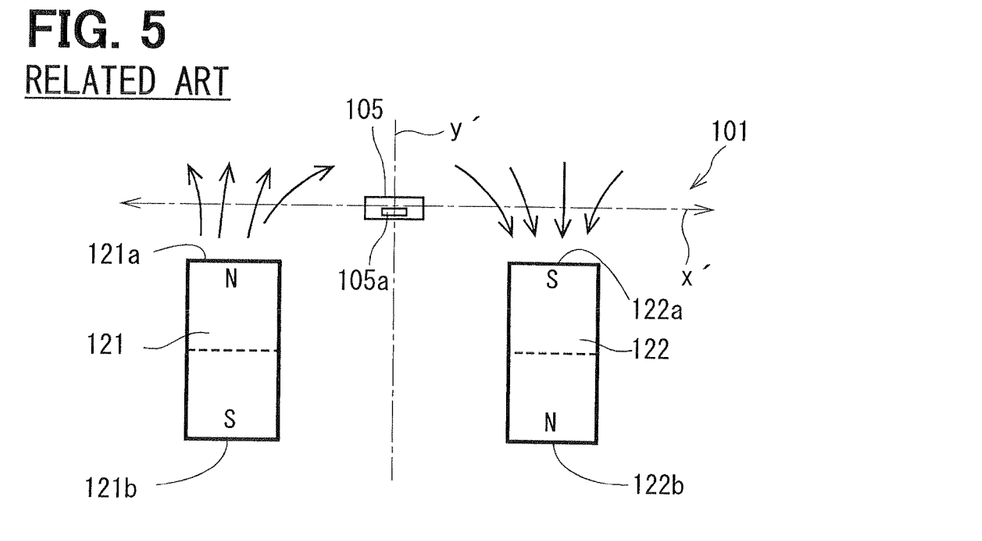
FIG. 5 is a schematic view illustrating a stroke amount detecting device in accordance with a comparative example.

FIG. 3B is a characteristic diagram illustrating a comparison of an output change due to the attachment of iron powder between the first embodiment and a comparative example. In the comparative example, as illustrated in FIG. 5, a first magnet 121 and a second magnet 122 are arranged parallel to a reference axis y'; and a distance between an open end 121a and an open end 122a, and a distance between a gap end 121b and a gap end 122b are the same. Thus, a small air gap is not formed. As a result, iron powder Fe is attached to the open ends 121a, 122a so that a direction of a magnetic flux vector (arrows in FIG. 5) can be changed. In FIG. 3B, a characteristic line S0 indicates an output change in relation to the amount of iron powder of the comparative example, and a characteristic line S1 indicates an output change in relation to the amount of iron powder of the first embodiment. As is evident from FIG. 3B, the first embodiment having the small air gap 4 produces a significant effect on inhibition of the output change.

Second to fourth embodiments will be described in reference to the accompanying drawings. The same numerals are used for indicating substantially the same components as the first embodiment, and their descriptions are omitted.

Second Embodiment

Figure 1B:
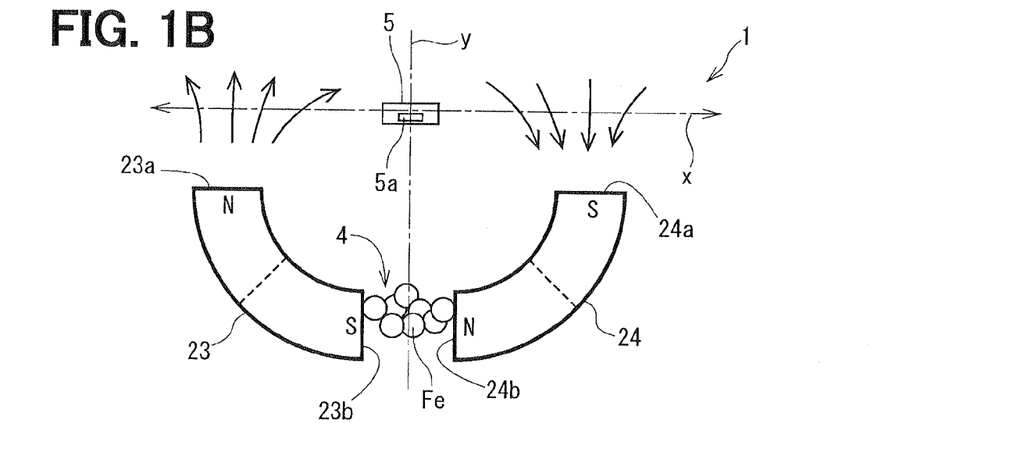
FIG. 1B is a schematic view illustrating a state of attachment of iron powder to a stroke amount detecting device in accordance with a second embodiment.

As illustrated in FIG. 1B, in the second embodiment, a first magnet 23 and a second magnet 24 are circular arc-shaped in section in a visual direction of FIG. 1B with their central angles having approximately 90 degrees; and the magnets 23, 24 are arranged symmetrically with respect to a reference axis y. The first magnet 23 is magnetized to be an N pole on its open end 23a-side, and magnetized to be an S pole on its gap end 23b-side. The second magnet 24 is magnetized to be an S pole on its open end 24a-side, and magnetized to be an N pole on its gap end 24b-side.

A distance between the open end 23a and the open end 24a is relatively long, and a distance between the gap end 23b and the gap end 24b is relatively short. The open ends 23a, 24a are arranged closer to a rectilinear axis x, and the gap ends 23b, 24b are arranged farther from the rectilinear axis x. A small air gap 4 is formed between the gap end 23b and the gap end 24b. At the small air gap 4, the N pole of the magnet 24 and the S pole of the magnet 23 are opposed with a short distance therebetween, so that relatively strong magnetic flux is produced.

The iron powder Fe which has entered in the device 1 is attracted to the strong magnetic flux of the small air gap 4 to be attached preferentially to the gap ends 23b, 24b, and attachment of the iron powder Fe to the open ends 23a, 24a is thereby prevented. The direction of the magnetic flux vector (arrows in FIG. 1B) between the open end 23a and the open end 24a does not change because of the attachment of the iron powder Fe to the gap ends 23b, 24b. Therefore, the detection accuracy of the stroke amount detecting device 1 is maintained without exerting influence upon the output of the magnetoresistive element 5.

Third Embodiment

Figure 1C:
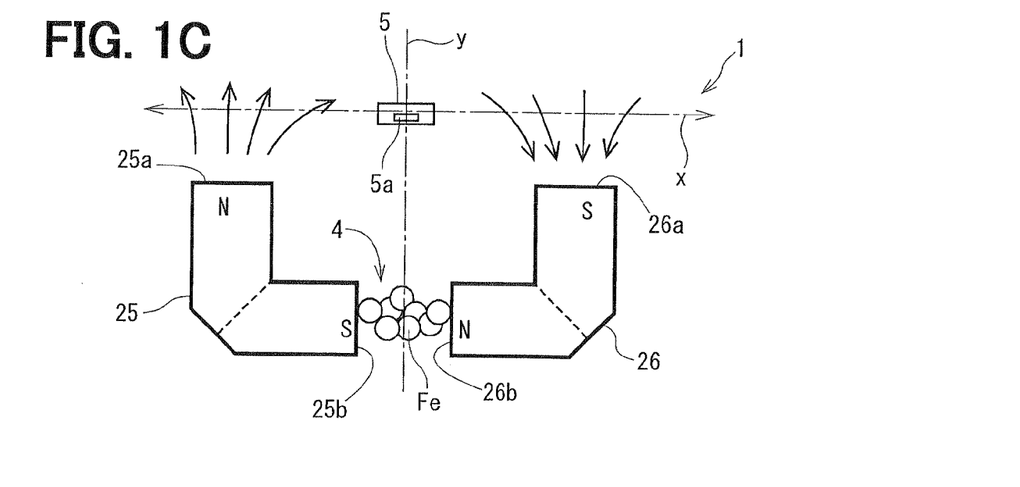
FIG. 1C is a schematic view illustrating a state of attachment of iron powder to a stroke amount detecting device in accordance with a third embodiment.

As illustrated in FIG. 1C, in the third embodiment, a first magnet 25 and a second magnet 26 are L-shaped in section in a visual direction of FIG. 1C, and arranged symmetrically with respect to a reference axis y. The first magnet 25 is magnetized to be an N pole on its open end 25a-side, and magnetized to be an S pole on its gap end 25b-side. The second magnet 26 is magnetized to be an S pole on its open end 26a-side, and magnetized to be an N pole on its gap end 26b-side. Accordingly, the first and second magnets 25, 26 are magnetized such that their opposed magnetic poles have different magnetisms from each other.

The open ends 25a, 26a are arranged closer to a rectilinear axis x, and the gap ends 25b, 26b are arranged farther from the rectilinear axis x. A distance between the open end 25a and the open end 26a is relatively long, and a distance between the gap end 25b and the gap end 26b is relatively short. A small air gap 4 is formed between the gap end 25b and the gap end 26b. At the small air gap 4, the N pole of the magnet 26 and the S pole of the magnet 25 are opposed with a short distance therebetween, so that relatively strong magnetic flux is produced.

The iron powder Fe which has entered in the device 1 is attracted to the strong magnetic flux of the small air gap 4 to be attached preferentially to the gap ends 25b, 26b, and attachment of the iron powder Fe to the open ends 25a, 26a is thereby prevented. The direction of the magnetic flux vector (arrows in FIG. 1C) between the open end 25a and the open end 26a does not change because of the attachment of the iron powder Fe to the gap ends 25b, 26b. Therefore, the detection accuracy of the stroke amount detecting device 1 is maintained without exerting influence upon the output of the magnetoresistive element 5.

Fourth Embodiment

Figure 4:
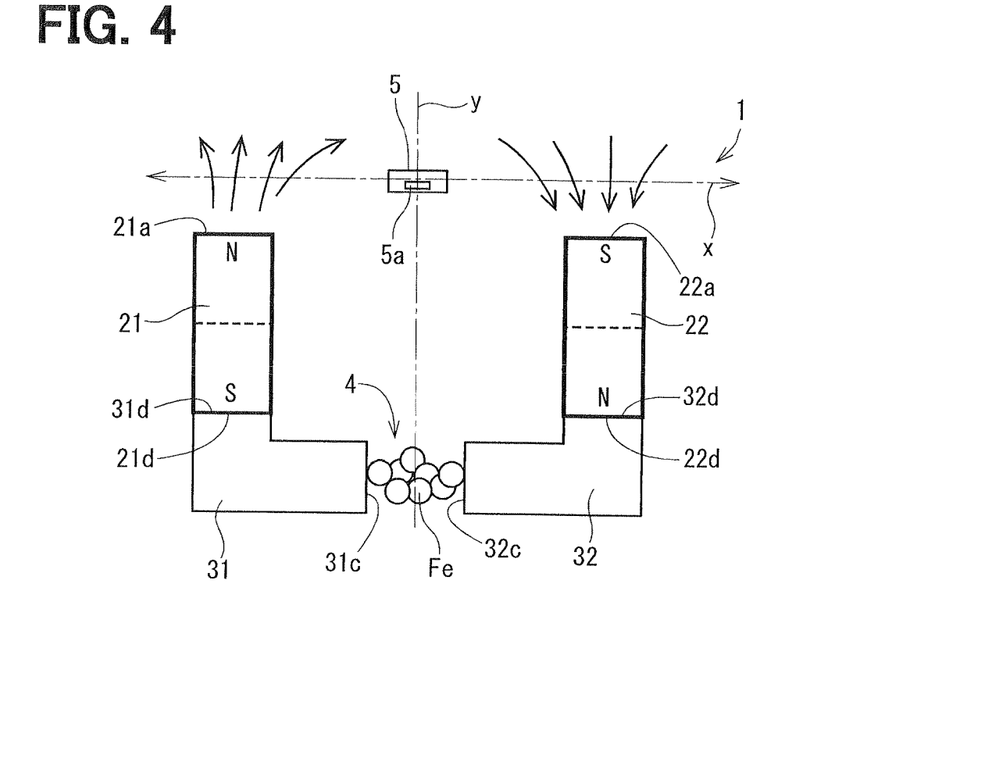
FIG. 4 is a schematic view illustrating a state of attachment of iron powder to a stroke amount detecting device in accordance with a fourth embodiment.

As illustrated in FIG. 4, in the fourth embodiment, a first yoke 31 (first magnetic flux transmitting means (unit)) is connected to a connecting end 21d of a first magnet 21, and a second yoke 32 (second magnetic flux transmitting means (unit)) is connected to a connecting end 22d of a second magnet 22. The first magnet 21 and the second magnet 22 are rectangular in section, and are arranged symmetrically with respect to a reference axis y as well as generally parallel to the reference axis y. The first magnet 21 is magnetized to be an N pole on its open end 21a-side, and magnetized to be an S pole on its connecting end 21d-side. The second magnet 22 is magnetized to be an S pole on its open end 22a-side, and magnetized to be an N pole on its connecting end 22d-side. Accordingly, the first and second magnets 21, 22 are magnetized such that their opposed magnetic poles have different magnetisms from each other.

The first yoke 31 and the second yoke 32 are formed from a magnetic material such as a steel material, and are L-shaped in section. The yokes 31, 32 are arranged symmetrically with respect to a reference axis y. Connecting ends 31d, 32d are connected to the magnets 21, 22 to transmit magnetic flux generated by the magnets 21, 22. Therefore, a gap end 31c of the first yoke 31 is regarded as a pseudo-S pole, and a gap end 32c of the second yoke 32 is regarded as a pseudo-N pole.

The respective open ends 21a, 22a of the magnets 21, 22 are arranged closer to a rectilinear axis x, and the respective gap ends 31c, 32c of the yokes 31, 32 are arranged farther from the rectilinear axis x. A distance between the open end 21a and the open end 22a of the magnets 21, 22 is relatively long, and a distance between the gap end 31c and the gap end 32c of the yokes 31, 32 is relatively short. A small air gap 4 is formed between the gap end 31c and the gap end 32c. Relatively strong magnetic flux is generated at the small air gap 4.

The iron powder Fe which has entered in the device 1 is attracted to the strong magnetic flux of the small air gap 4 to be attached preferentially to the gap ends 31c, 32c of the yokes 31, 32, and attachment of the iron powder Fe to the open ends 21a, 22a of the magnets 21, 22 is thereby prevented. The direction of the magnetic flux vector (arrows in FIG. 4) between the open end 21a and the open end 22a of the magnets 21, 22 does not change because of the attachment of the iron powder Fe to the gap ends 31c, 32c. Therefore, the detection accuracy of the stroke amount detecting device 1 is maintained without exerting influence upon the output of the magnetoresistive element 5.

In the fourth embodiment, through the combination of the magnets 21, 22 and the yokes 31, 32, the magnets 21, 22 can have simple shapes, and furthermore, an adjustment of the distance of the small air gap 4 becomes easy.

Modifications of the above embodiments will be described. As well as their symmetrical arrangement with respect to the reference axis y as in the above embodiments, the first magnet and the second magnet, and the first yoke and the second yoke may be arranged unsymmetrically with respect to the reference axis y. Moreover, their shapes are not limited to those in the above embodiments. Furthermore, the first magnet and the second magnet, and the first yoke and the second yoke do not necessarily have the same magnetic properties.

For the magnetism detecting means (unit), a Hall element may be employed instead of the magnetoresistive element. In the case of the Hall element, detected magnetic flux density changes to some extent due to the attachment of iron powder to the gap end. Therefore, the detected magnetic flux density may be corrected by a correcting means. The magnetizing direction of the magnet is not limited to the above embodiments. For example, the N pole and the S pole in the above embodiments may be reversed. In addition, for example, in reference to the magnet having a rectangular shape in section in the first embodiment, the magnet may be magnetized in its diagonal direction.

The invention is not by any means limited to such embodiments, and may be embodied in various modes without departing from the scope of the invention.

To sum up, the stroke amount detecting device 1 of the above embodiments can be described as follows.

According to the first aspect of the disclosure, a stroke amount detecting device 1 is for detecting a stroke of a detection object 3a which moves rectilinearly. The device 1 includes a magnetism detecting unit 5, and a first magnetic field generating unit 21, 23, 25 and a second magnetic field generating unit 22, 24, 26. The magnetism detecting unit 5 includes a magnetism sensing surface 5a, and is displaced on a rectilinear axis x in accordance with the rectilinear movement of the detection object 3a. The first magnetic field generating unit 21, 23, 25 and the second magnetic field generating unit 22, 24, 26 are disposed on one side of the rectilinear axis x. The magnetism detecting unit 5 is displaced relative to the first magnetic field generating unit 21, 23, 25 and the second magnetic field generating unit 22, 24, 26. The first magnetic field generating unit 21, 23, 25 and the second magnetic field generating unit 22, 24, 26 are arranged to be spaced away from each other and opposed to each other in a direction of the stroke. A magnetic pole of the first magnetic field generating unit 21, 23, 25 and a magnetic pole of the second magnetic field generating unit 22, 24, 26, which are opposed to each other, are magnetized so as to have different polarities. The first magnetic field generating unit 21, 23, and the second magnetic field generating unit 22, 24, 26 are arranged such that a distance between a gap end 21b, 23b, 25b of the first magnetic field generating unit 21, 23, 25 and a gap end 22b, 24b, 26b of the second magnetic field generating unit 22, 24, 26, which are located on a farther side of the rectilinear axis x, is smaller than a distance between an open end 21a, 23a, 25a of the first magnetic field generating unit 21, 23, 25 and an open end 22a, 24a, 26a of the second magnetic field generating unit 22, 24, 26, which are located on a closer side of the rectilinear axis x. The magnetism detecting unit 5 is configured to detect an amount of the stroke of the detection object 3a based on a magnetic flux generated between the open end 21a, 23a, 25a of the first magnetic field generating unit 21, 23, 25 and the open end 22a, 24a, 26a of the second magnetic field generating unit 22, 24, 26.

Accordingly, the small air gap 4 is formed at a relatively short clearance between the gap ends 21b, 22b; 23b, 24b; 25b, 26b. At the small air gap 4, the N pole of the magnet and the S pole of the magnet are opposed with a short distance therebetween, so that relatively strong magnetic flux is produced. On the assumption that a magnetic foreign substance enters into the stroke amount detecting device 1, the magnetic foreign substance which has entered in the device 1 is attracted to the strong magnetic flux of the small air gap 4 to be attached preferentially to the gap ends 21b, 22b; 23b, 24b; 25b, 26b, and attachment of the substance to the open ends 21a, 22a; 23a, 24a; 25a, 26a is thereby prevented. Consequently, an influence of the substance upon the magnetic flux vector on the open end 21a, 22a; 23a, 24a; 25a, 26a-side is reduced, so that the detection accuracy of the stroke amount detecting device 1 is maintained.

According to the second aspect of the disclosure, a stroke amount detecting device 1 is for detecting a stroke of a detection object 3a which moves rectilinearly. The device 1 includes a magnetism detecting unit 5, a first magnetic field generating unit 21 and a second magnetic field generating unit 22, a first magnetic flux transmitting unit 31, and a second magnetic flux transmitting unit 32. The magnetism detecting unit 5 includes a magnetism sensing surface 5a, and is displaced on a rectilinear axis x in accordance with the rectilinear movement of the detection object 3a. The first magnetic field generating unit 21 and the second magnetic field generating unit 22 are disposed on one side of the rectilinear axis x. The magnetism detecting unit 5 is displaced relative to the first magnetic field generating unit 21 and the second magnetic field generating unit 22. The first magnetic field generating unit 21 and the second magnetic field generating unit 22 are arranged to be spaced away from each other and opposed to each other in a direction of the stroke. A magnetic pole of the first magnetic field generating unit 21 and a magnetic pole of the second magnetic field generating unit 22, which are opposed to each other, are magnetized so as to have different polarities. The first magnetic flux transmitting unit 31 is formed from a magnetic material. A connecting end 31d of the first magnetic flux transmitting unit 31 is connected to an end 21d of the first magnetic field generating unit 21 which is located on a farther side of the rectilinear axis x. The second magnetic flux transmitting unit 32 is formed from a magnetic material. A connecting end 32d of the second magnetic flux transmitting unit 32 is connected to an end 22d of the second magnetic field generating unit 22, which is located on the farther side of the rectilinear axis x. The first magnetic field generating unit 21, the second magnetic field generating unit 22, the first magnetic flux transmitting unit 31, and the second magnetic flux transmitting unit 32 are arranged such that a distance between a gap end 31c of the first magnetic flux transmitting unit 31 located on its opposite side from the connecting end 31d of the first magnetic flux transmitting unit 31 and a gap end 32c of the second magnetic flux transmitting unit 32 located on its opposite side from the connecting end 32d of the second magnetic flux transmitting unit 32 is smaller than a distance between an open end 21a of the first magnetic field generating unit 21, which is located on a closer side of the rectilinear axis x, and an open end 22a of the second magnetic field generating unit 22, which is located on the closer side of the rectilinear axis x. The magnetism detecting unit 5 is configured to detect an amount of the stroke of the detection object 3a based on a magnetic flux generated between the open end 21a of the first magnetic field generating unit 21 and the open end 22a of the second magnetic field generating unit 22.

In the second aspect of the disclosure, as compared to the first aspect of the disclosure, the small air gap 4 is formed between the gap ends 31c, 32c of the magnetic flux transmitting means (unit) 31, 32 which are connected to the magnetic field generating means (unit) 21, 22, and a similar effect to the first aspect is produced. Through the combination of the magnetic field generating means (unit) 21, 22 and the magnetic flux transmitting means (unit) 31, 32, the magnetic field generating means (unit) 21, 22 can have simple shapes, and furthermore, an adjustment of the distance of the small air gap 4 becomes easy.

The magnetism detecting unit 5 may be a magnetoresistive element 5. The direction of the magnetic flux vector from the open end 21a, 23a, 25a of the first magnetic field generating means (unit) 21, 23, 25 toward the open end 22a, 24a, 26a of the second magnetic field generating means (unit) 22, 24, 26 changes continuously from one side to the other side of the stroke range. The magnetoresistive element 5 is displaced relatively to the magnets 21, 22; 23, 24; 25, 26 on the rectilinear axis x to detect the direction of the magnetic flux vector by its magnetism sensing surface 5a.

For example, if a Hall element which detects the magnetic flux density of the magnetic flux vector is used for the magnetism detecting means (unit) 5, the magnetic flux density of the magnetic flux vector generated on the open end 21a, 22a, 23a, 24a, 25a, 26a-side may also be affected to some extent by a magnetic foreign substance attached to the gap ends 21b, 22b, 23b, 24b, 25b, 26b, 31c, 32c of the magnetic field generating means (unit) 21, 22, 23, 24, 25, 26 or the magnetic flux transmitting means (unit) 31, 32. Accordingly, in order to maintain detection accuracy, the detection output needs to be corrected by the correcting means, for example. In contrast, if the magnetoresistive element 5 is used for the magnetism detecting means (unit) 5, the direction of the magnetic flux vector on the open end 21a, 22a, 23a, 24a, 25a, 26a-side does not change due to the attachment of the magnetic foreign substance to the gap ends 21b, 22b, 23b, 24b, 25b, 26b, 31c, 32c. Therefore, the detection accuracy of the stroke amount detecting device 1 is maintained without exerting influence upon the output of the magnetoresistive element 5.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A stroke amount detecting device for detecting a stroke of a detection object which moves rectilinearly, the device comprising:
    a magnetism detecting unit that includes a magnetism sensing surface and is displaced on a rectilinear axis in accordance with the rectilinear movement of the detection object; and
    a first magnetic field generating unit and a second magnetic field generating unit that are disposed on one side of the rectilinear axis, wherein:
    the magnetism detecting unit is displaced relative to the first magnetic field generating unit and the second magnetic field generating unit;
    the first magnetic field generating unit and the second magnetic field generating unit are arranged to be spaced away from each other and opposed to each other in a direction of the stroke;
    a magnetic pole of the first magnetic field generating unit and a magnetic pole of the second magnetic field generating unit, which are opposed to each other, are magnetized so as to have different polarities;
    the first magnetic field generating unit and the second magnetic field generating unit are arranged such that a distance between a gap end of the first magnetic field generating unit and a gap end of the second magnetic field generating unit, which are located on a farther side of the rectilinear axis and are magnetized so as to have different polarities, is smaller than a distance between an open end of the first magnetic field generating unit and an open end of the second magnetic field generating unit, which are located on a closer side of the rectilinear axis; and
    the magnetism detecting unit is configured to detect an amount of the stroke of the detection object based on a magnetic flux generated between the open end of the first magnetic field generating unit and the open end of the second magnetic field generating unit.

2. The stroke amount detecting device according to claim 1, wherein the magnetism detecting unit is a magnetoresistive element.

3. A stroke amount detecting device for detecting a stroke of a detection object which moves rectilinearly, the device comprising:
    a magnetism detecting unit that includes a magnetism sensing surface and is displaced on a rectilinear axis in accordance with the rectilinear movement of the detection object;
    a first magnetic field generating unit and a second magnetic field generating unit that are disposed on one side of the rectilinear axis, wherein:
    the magnetism detecting unit is displaced relative to the first magnetic field generating unit and the second magnetic field generating unit;
    the first magnetic field generating unit and the second magnetic field generating unit are arranged to be spaced away from each other and opposed to each other in a direction of the stroke; and
    a magnetic pole of the first magnetic field generating unit and a magnetic pole of the second magnetic field generating unit, which are opposed to each other, are magnetized so as to have different polarities;
    a first magnetic flux transmitting unit that is formed from a magnetic material, a connecting end of the first magnetic flux transmitting unit being connected to an end of the first magnetic field generating unit which is located on a farther side of the rectilinear axis; and
    a second magnetic flux transmitting unit that is formed from a magnetic material, a connecting end of the second magnetic flux transmitting unit being connected to an end of the second magnetic field generating unit, which is located on the farther side of the rectilinear axis, wherein:
    the first magnetic field generating unit, the second magnetic field generating unit, the first magnetic flux transmitting unit, and the second magnetic flux transmitting unit are arranged such that a distance between a gap end of the first magnetic flux transmitting unit located on its opposite side from the connecting end of the first magnetic flux transmitting unit and a gap end of the second magnetic flux transmitting unit located on its opposite side from the connecting end of the second magnetic flux transmitting unit is smaller than a distance between an open end of the first magnetic field generating unit, which is located on a closer side of the rectilinear axis, and an open end of the second magnetic field generating unit, which is located on the closer side of the rectilinear axis, and such that the distance between the gap end of the first magnetic flux transmitting unit and the gap end of the second magnetic flux transmitting unit is smaller than a distance between the end of the first magnetic field generating unit which is located on the farther side of the rectilinear axis and the end of the second magnetic field generating unit, which is located on the farther side of the rectilinear axis;

the gap end of the first magnetic flux transmitting unit and the gap end of the second magnetic flux transmitting unit are magnetized so as to have different polarities; and the magnetism detecting unit is configured to detect an amount of the stroke of the detection object based on a magnetic flux generated between the open end of the first magnetic field generating unit and the open end of the second magnetic field generating unit.

4. The stroke amount detecting device according to claim 3, wherein the magnetism detecting unit is a magnetoresistive element.

* * * * *